W. J. KING.
GATE OPERATING MECHANISM.
APPLICATION FILED MAR. 28, 1914.
1,166,768.
Patented Jan. 4, 1916.
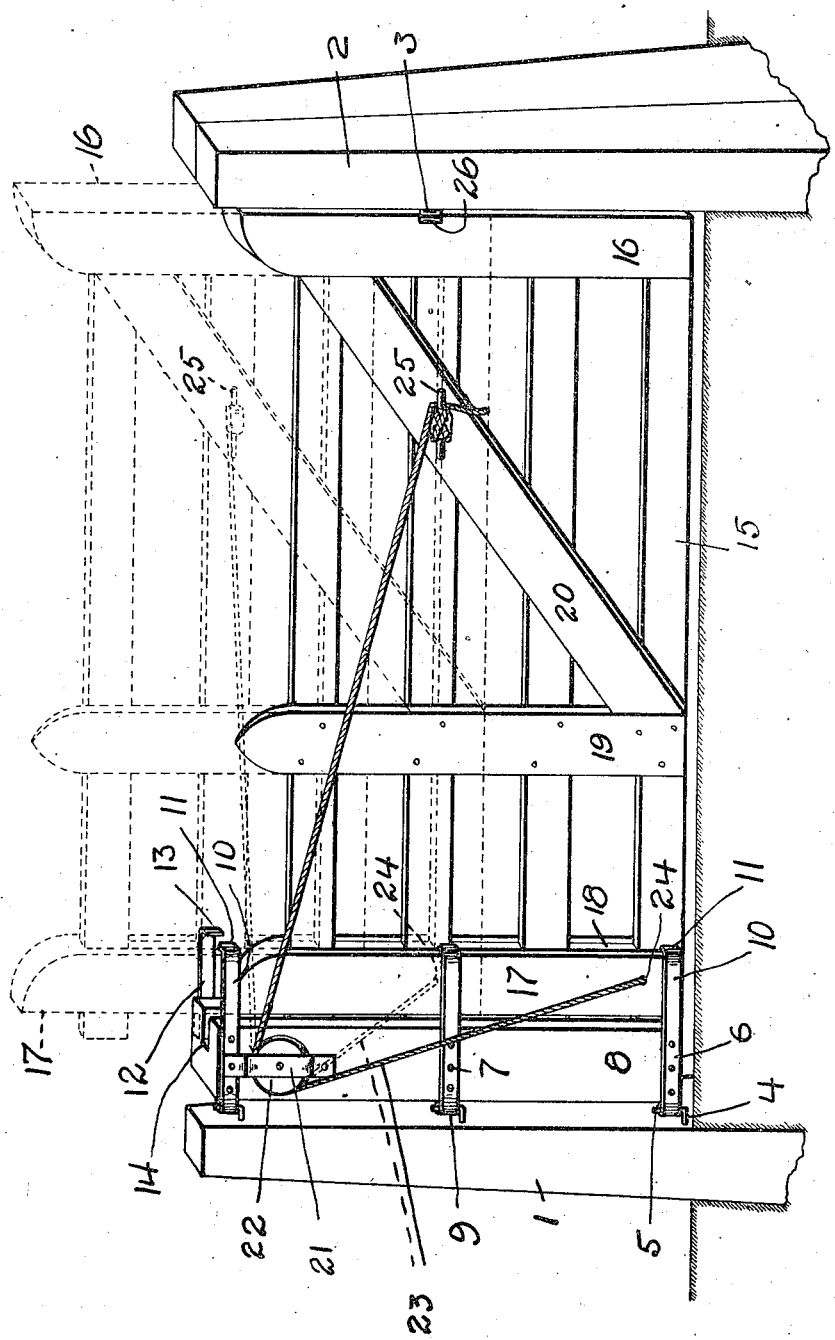
WITNESSES
INVENTOR
W. J. King.
by Henry C. Evert
ATTORNEY

UNITED STATES PATENT OFFICE.

WILLIAM JAMES KING, OF BULGER, PENNSYLVANIA.

GATE-OPERATING MECHANISM.

1,166,768.      Specification of Letters Patent.      Patented Jan. 4, 1916.

Application filed March 28, 1914. Serial No. 827,853.

*To all whom it may concern:*

Be it known that I, WILLIAM JAMES KING, a citizen of the United States of America, residing at Bulger, in the county of Washington and State of Pennsylvania, have invented certain new and useful Improvements in Gate-Operating Mechanism, of which the following is a specification, reference being had therein to the accompanying drawing.

This invention relates to gate operating mechanism, and has for its object to provide, in a manner as hereinafter set forth, a gate formed of a pivoted section and a vertically adjustable section carried by the pivoted section, the vertically adjustable section enabling the opening of the gate above the level of a fall of snow and to further permit of an opening for the passage of small animals between two fields when the gate is closed.

Further objects of the invention are to provide a swinging gate, which is simple in its construction and arrangement, strong, durable, efficient and convenient in its use, readily set up and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claim hereunto appended.

The drawing illustrates an elevation of a gate in accordance with this invention, showing in full lines the vertically movable section lowered and in dotted lines the vertically movable section elevated.

Referring to the drawing in detail, 1 and 2 denote spaced gate posts and the latter is provided with a latch 3, while the former has projecting from its inner side a series of vertically disposed spaced hooks 4. The vertical arms 5 of the hooks 4 constitute pintles for strapping the hinges 6, which are secured by holdfast devices to one side of the pivoted section 8 of the gate body. The strapped hinges 6 have their inner ends provided with barrels 9 through which extend the vertical arms 5 of the hooks 4 and the said hinges 6 project outwardly from the section 8 as at 10, and have their outer ends formed with inwardly extending flanges 11. The other side of the section 8 has secured thereto a series of straps 12 which oppose the hinges 6, and the outer ends of said straps 10, are provided with inwardly extending flanges 13, which oppose and are spaced from the flanges 11. The pivoted section 8 is formed with a vertically disposed grove 14, which extends from the lower to the upper end of said section 8.

The gate body further includes a vertically adjustable section which consists of a series of longitudinally extending horizontally spaced members 15, having one end thereof fixedly secured to an upright 16 and arranged against the members 15, inwardly with respect to the other ends thereof, is a bifurcated upright 17, the latter being fixedly secured in any suitable manner to the members 15. The members 15 extend through the furcation 18 or project beyond said member 17 and permanently extend into the groove 14, whereby when the section 8 is swung on its pivot, the vertically adjustable section is moved therewith.

The hinges 6 as well as the straps 12, overlap the uprights 17, whereby the vertically adjustable section of the gate body is coupled with the pivoted section, but the said hinges 6 and straps 12 do not interfere with the elevating or lowering movements of the adjustable section of the gate body.

Secured to the members 15 is a vertically extending brace 19 and arranged between the brace 19 and the upright 16 is an inclined brace 20.

Secured to the section 8 near the top thereof, is a bracket 21, in which is journaled a sheave or pulley 22 having passing thereover a flexible elevating member 23. One end of the member 23 is fixedly secured as at 24 to the lower end of the upright 17, and the other end of the member 23 is wrapped around an anchoring device 25, which is secured to the inclined member 20.

The latch 3 is adapted to engage as at 26 with the uprights 16 for maintaining the gate closed, that is to say when the adjustable section of the gate body is in a lowered position.

It will be assumed that there has been a fall of snow, say a fall of a foot and a half deep, and under such conditions if the adjustable gate section was in a lowered position, it would be very difficult to open the gate body. Under the circumstances just set forth, the member 23 is pulled so as to elevate the adjustable gate section to the position shown in dotted lines, then the said gate section, in connection with the gate section 8 can be swung whereby the gate body will be moved to open position.

If it be desired to provide an entrance for small animals between two fields without opening the gate body, the adjustable section of the gate body is elevated to the position shown in dotted lines in the drawing.

What I claim is:—

In a gate of the class described, the combination with a hinged post and hook members carried thereon forming pintles; of a gate body consisting of a hinged section provided with a vertical slot in the outer side edge thereof, an adjustable section including a vertically slotted inner end post abutting the hinged section, an outer end post, horizontal gate bars secured between said end and having their inner ends extending through the slot in the inner post whereby to project therebeyond, the projecting portions of said gate bars operating in the slot of said hinged section, pairs of horizontal straps secured to the side faces of said hinged section and projecting beyond the outer side edge thereof, the extreme free ends of the same being inturned to engage the edges of the slotted inner post of the gate body, whereby to form a guide for the latter as the same is raised and lowered, the inner end of said strap on each pair being also extended beyond the inner side edge of the hinged section and designed to form a knuckle for engagement with an adjacent pintle on the hinged post, and means for raising and lowering the gate body and retaining the same in any adjusted position.

In testimony whereof I affix my signature in the presence of two witnesses.

WILLIAM JAMES KING.

Witnesses:
JOHN L. STEWART,
A. D. STEWART.